(12) United States Patent
Jain et al.

(10) Patent No.: US 8,886,781 B2
(45) Date of Patent: Nov. 11, 2014

(54) LOAD BALANCING IN CLUSTER STORAGE SYSTEMS

(75) Inventors: Navendu Jain, Bellevue, WA (US); Gae-won You, Gyeonbuk (KR)

(73) Assignee: Microsoft Corporation, Redmond, WA (US)

( * ) Notice: Subject to any disclaimer, the term of this patent is extended or adjusted under 35 U.S.C. 154(b) by 86 days.

(21) Appl. No.: 13/324,497

(22) Filed: Dec. 13, 2011

(65) Prior Publication Data

US 2013/0151683 A1 Jun. 13, 2013

(51) Int. Cl.
*G06F 15/16* (2006.01)
(52) U.S. Cl.
USPC ............ 709/223; 709/213; 709/248; 707/737
(58) Field of Classification Search
CPC ... G06F 3/0611; G06F 3/0689; G06F 3/0647; G06F 3/0683; G06F 3/0646; G06F 3/0653; G06F 3/0655; G06F 17/30584
USPC .................. 709/223, 224, 213, 248; 707/737, 707/E17.046; 711/165, 114
See application file for complete search history.

(56) References Cited

U.S. PATENT DOCUMENTS

| | | | |
|---|---|---|---|
| 5,555,404 A * | 9/1996 | Torbj.o slashed.rnsen et al. | 1/1 |
| 6,256,295 B1 * | 7/2001 | Callon | 370/254 |
| 7,685,385 B1 * | 3/2010 | Choudhary et al. | 711/162 |
| 7,761,678 B1 * | 7/2010 | Bodmer et al. | 711/165 |
| 2004/0064577 A1 * | 4/2004 | Dahlin et al. | 709/235 |
| 2005/0102676 A1 | 5/2005 | Forrester | |
| 2007/0064702 A1 * | 3/2007 | Bates et al. | 370/392 |
| 2007/0250604 A1 * | 10/2007 | Wu et al. | 709/220 |
| 2008/0104349 A1 * | 5/2008 | Maruyama et al. | 711/165 |
| 2008/0141264 A1 | 6/2008 | Johnson | |
| 2009/0147760 A1 * | 6/2009 | Lee et al. | 370/338 |
| 2009/0254468 A1 * | 10/2009 | Acedo et al. | 705/35 |
| 2010/0131733 A1 | 5/2010 | Jess | |
| 2010/0274966 A1 * | 10/2010 | Kawaguchi et al. | 711/114 |

(Continued)

FOREIGN PATENT DOCUMENTS

KR 10-2007-0032441 A 3/2007

OTHER PUBLICATIONS

Abd-El-Malek, et al., "Ursa Minor: versatile cluster-based storage", Proceedings of the 4th USENIX Conference on File and Storage Technology (FAST '05), Dec. 13-16, 2005, San Francisco, CA, pp. 1-14.

(Continued)

*Primary Examiner* — Jude Jean Gilles
*Assistant Examiner* — Abdulkader M Alriyashi
(74) *Attorney, Agent, or Firm* — Dan Choi; David Andrews; Micky Minhas

(57) ABSTRACT

Methods and systems for load balancing in a cluster storage system are disclosed herein. The method includes identifying a source node within the cluster storage system from which to move a number of data objects, wherein the source node includes a node with a total load exceeding a threshold value. The method also includes selecting the data objects to move from the source node, wherein the data objects are chosen such that the total load of the source node no longer exceeds the threshold value. The method further includes determining a target node within the cluster storage system based on a proximity to the source node and the total load of the target node and moving the data objects from the source node to the target node.

17 Claims, 5 Drawing Sheets

(56) References Cited

U.S. PATENT DOCUMENTS

| | | | |
|---|---|---|---|
| 2010/0332532 A1* | 12/2010 | Joshi et al. | 707/770 |
| 2011/0213883 A1* | 9/2011 | Athey et al. | 709/226 |
| 2012/0254175 A1* | 10/2012 | Horowitz et al. | 707/737 |
| 2012/0265741 A1* | 10/2012 | Moon et al. | 707/694 |
| 2012/0269200 A1* | 10/2012 | Aggarwal | 370/410 |

OTHER PUBLICATIONS

Anderson, et al., "Quickly finding near-optimal storage designs", ACM Journal Name, vol. V, No. N, Month 20YY, pp. 1-34.

Chang, et al., "Bigtable: A Distributed Storage System for Structured Data", {fay,jeff,sanjay,wilsonh,kerr,m3b,tushar,fikes,gruber}@google.com, Google, Inc., pp. 1-14.

Curino, et al., "Schism: a Workload-Driven Approach to Database Replication Replication and Partitioning", Proceedings of the VLDB Endowment, 2010 Singapore, vol. 3, No. 1, 2010, VLDB Endowment 2150-8097/10/09, pp. 48-57.

Curino, et al., "Relational Cloud: The Case for a Database Service", Computer Science and Artificial Intelligence Laboratory Report, Mar. 14, 2010, Massachusetts Institute of Technology, Cambridge, Massachusetts 02139, USA, pp. 1-8.

Das, et al., "Live Database Migration for Elasticity in a Mulitetenant Database for Cold Platforms", UCSB Computer Science Technical Report Sep. 2010, pp. 1-14.

Dean, et al., "MapReduce: Simplified Data Processing on Large Clusters", Google, Inc., to Appear in OSDI 2004, pp. 1-13.

Elmore, et al., "Who's Driving this Cloud? Towards Efficient Migration for Elastic and Autonomic Multitenant Databases", UCSB Computer Science Technical Report May 2010, pp. 1-5.

Elmore, et al., "Zephyr: Live Migration in Shared Nothing Databases for Elastic Cloud Platforms", SIGMOD '11, Jun. 12-16, 2011, Athens, Greece, pp. 1-12.

Ghemawat, et al., "The Google File System", SOSP '03, Oct. 19-22, 2003, Bolton Landing, New York, USA, pp. 1-15.

Greenberg, et al., "VL2: A Scalable and Flexible Data Center Network", SIGCOMM '09, Aug. 17-21, 2009, Barcelona, Spain, pp. 51-62.

Gulati, et al., "BASIL: Automated IO Load Balancing Across Storage Devices", pp. 1-14.

Kunkle, et al., "A Load Balancing Framework for Clustered Storage Systems", HiPC 2008, LNCS 5374, 2008, Springer-Verlag Berlin Heidelberg, pp. 57-72.

Lang, et al., "On Energy Management, Load Balancing and Replication", SIGMOD Record, Dec. 2009, vol. 38, No. 4, pp. 35-42.

Litwin, "Linear Hashing: A New Tool for File and Table Addressing.", I.N.R.I.A., 1980 IEEE, 78 150 Le Chesnay, France, pp. 212-223.

Narayanan, et al., "Everest: Scaling down peak loads through I/O off-loading", Microsoft Research Cambridge, United Kingdom, {dnarayan,austind,etheres,samehe,antr}©microsoft.com, pp. 1-19.

Singh, et al., "Server-Storage Virtualization: Integration and Load Balancing in Data Centers", pp. 1-12.

Tam Vo, et al., "Towards Elastic Transactional Cloud Storage with Range Query Support", Proceedings of the VLDB Endowment, vol. 3, No. 1, 2010, pp. 506-517.

Thereska, et al., "Sierra: a power-proportional, distributed storage system", Microsoft Research Ltd. Technical Report MSR-TR-209-153, Nov. 2009, Cambridge UK, pp. 1-15.

Venkataramani, et al., "TCP Nice: A Mechanism for Background Transfers", USENIX Association, 5th Symposium on Operating Systems Design and Implementation, pp. 329-343.

Verma, et al., "pMapper: Power and Migration Cost Aware Application Placement in Virtualized Systems", LNCS 5346, Middleware 2008, IFIP International Federation for Information Processing 2008, pp. 243-264.

Weil, et al., "Ceph: A Scalable, High-Performance Distributed File System", {sage, scott, elm, darrell, carlosm}@cs.ucsc.edu, University of California, Santa Cruz, pp. 1-14.

Yin, et al., "Rhizoma: a runtime for self-deploying, self-managing overlays", pp. 1-20.

Zeng, et al., "A Strategy of Load Balancing in Object Storage System", Proceedings of the 2005, The Fifth Conference on Computer and Information Technology (CIT '05), IEEE Computer Society, pp. 1-5.

"Amazon Simple Storage Service (Amazon S3)", Amazon.com, 2011, pp. 1-10.

"Focus on your application. Not the infrastructure.", Retrieved at <<http://www.microsoft.com/windowsazure/>>, Oct. 19, 2011, p. 1.

"International Search Report", Mailed Date: Apr. 1, 2013, Application No. PCT/US2012/069595, Filed date: Dec. 13, 2012, pp. 8.

\* cited by examiner

300

LOAD BALANCING IN CLUSTER STORAGE SYSTEMS

BACKGROUND

Enterprise and cloud data centers can include tens of thousands of servers, providing petabytes of storage to a large number of users and applications. Moreover, as cloud services continue to grow rapidly, large-scale cloud storage systems are being built to serve data to billions of users around the globe. The primary goal for these systems is to provide scalable performance and high-availability data storage systems, while minimizing operational expenses, particularly the bandwidth cost of moving data in the storage system. However, diverse input/output (I/O) workloads can cause significant data imbalance across servers, resulting in hot spots, or servers/disk drives that are overburdened with a large number of I/O requests. Such hot spots may cause high delays to end users. As a result, these services typically shuffle terabytes of data per day to balance the load across clusters. Furthermore, the same challenge has been raised and actively discussed in the context of building databases on clouds. However, this solution either does not address dynamic load reconfiguration or assumes the source and target nodes of dynamic data migration are known by an object-relational database management system.

Moreover, prior techniques have aimed to solve these challenges individually. To address load imbalance, many techniques perform dynamic placement of individual data objects, or distribute objects randomly across the cluster, e.g., based on hashing. However, adaptively redistributing objects involves the knowledge of load patterns for billions of objects. Optimizing reconfiguration costs for these patterns calls for offline solvers, e.g., knapsack or linear programming-based solvers, to make migration decisions. However, as such optimization is inherently expensive, these approaches are suitable at a small scale and less effective when systems grow to a large scale. Meanwhile, approaches trading effectiveness to achieve scalability, for instance, by using a simulated annealing or an evolutionary algorithm, suffer from high reconfiguration costs.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for load balancing in a cluster storage system. The method includes identifying a source node within the cluster storage system from which to move a number of data objects, wherein the source node includes a node with a total load exceeding a threshold value. The method also includes selecting the data objects to move from the source node, wherein the data objects are chosen such that the total load of the source node no longer exceeds the threshold value. The method further includes determining a target node within the cluster storage system based on a proximity to the source node and the total load of the target node and moving the data objects from the source node to the target node.

Another embodiment provides a system for load balancing in a cluster storage system. The system includes a source node, wherein the source node is a node within the cluster storage system with a first total load exceeding a threshold value. The system also includes a target node, wherein the target node is a node within the cluster storage system with a second total load not exceeding the threshold value. The target node is chosen based on a proximity to the source node. The system further includes a load balancing system configured to select a number of data objects to move from the source node to the target node, wherein the data objects are chosen such that the first total load of the source node no longer exceeds the threshold value, and move the data objects from the source node to the target node.

Another embodiment provides one or more non-transitory, computer-readable storage media for storing computer-readable instructions. The computer-readable instructions provide a load balancing system when executed by one or more processing devices. The computer-readable instructions include code configured to identify a source node from which to move a number of data objects, wherein the source node is a hot spot. The computer-readable instructions also include code configured to select the data objects to move from the source node, wherein the data objects are chosen such that the source node is no longer a hot spot. Moreover, the computer-readable instructions include code configured to determine a target node, wherein the target node is not a hot spot and is located within a predetermined range from the source node, and move the data objects from the source node to the target node.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Various embodiments disclosed herein set forth a method and system for load balancing in cluster storage systems. Load balancing may be accomplished by migrating specific data objects from a source node to any number of target nodes. The source node may be a "hot spot," wherein a hot spot is a node with an aggregate load, e.g., a total number of input/output (I/O) operations per second or bytes transferred per second for read and write operations, exceeding a predetermined threshold value. Moreover, the specific data objects to be moved from the source node to the target node may be chosen based on the number of I/O operations, size, or requests, among other criteria, for each data object. The data objects may be arranged in order according to a load value for each data object, wherein the load value specifies the number of I/O requests for a specific data object. The data object with the highest load value may be migrated from the source node to the target node first. The migration of data objects may continue in descending order, i.e., from the highest load value to the lowest load value, until the aggregate load for the source node drops below the predetermined threshold value.

The system and method disclosed herein may perform the migration of the data objects according to "move operations," which involve the migration of data objects between two partitions. The two partitions may be chunks of data stored within two separate nodes, wherein a chunk may be a fragment of information of a certain predetermined size. The move operations may be performed such that the data objects are moved from a source node to the closest appropriate target node. Moreover, in various embodiments, it may be assumed that "swap operations" have already been performed prior to the move operations. Swap operations may involve the switching of a role of a primary replica and a secondary replica of a partition, wherein the primary replica and the secondary replica may be located on two separate nodes within the cluster storage system.

Figure 1:
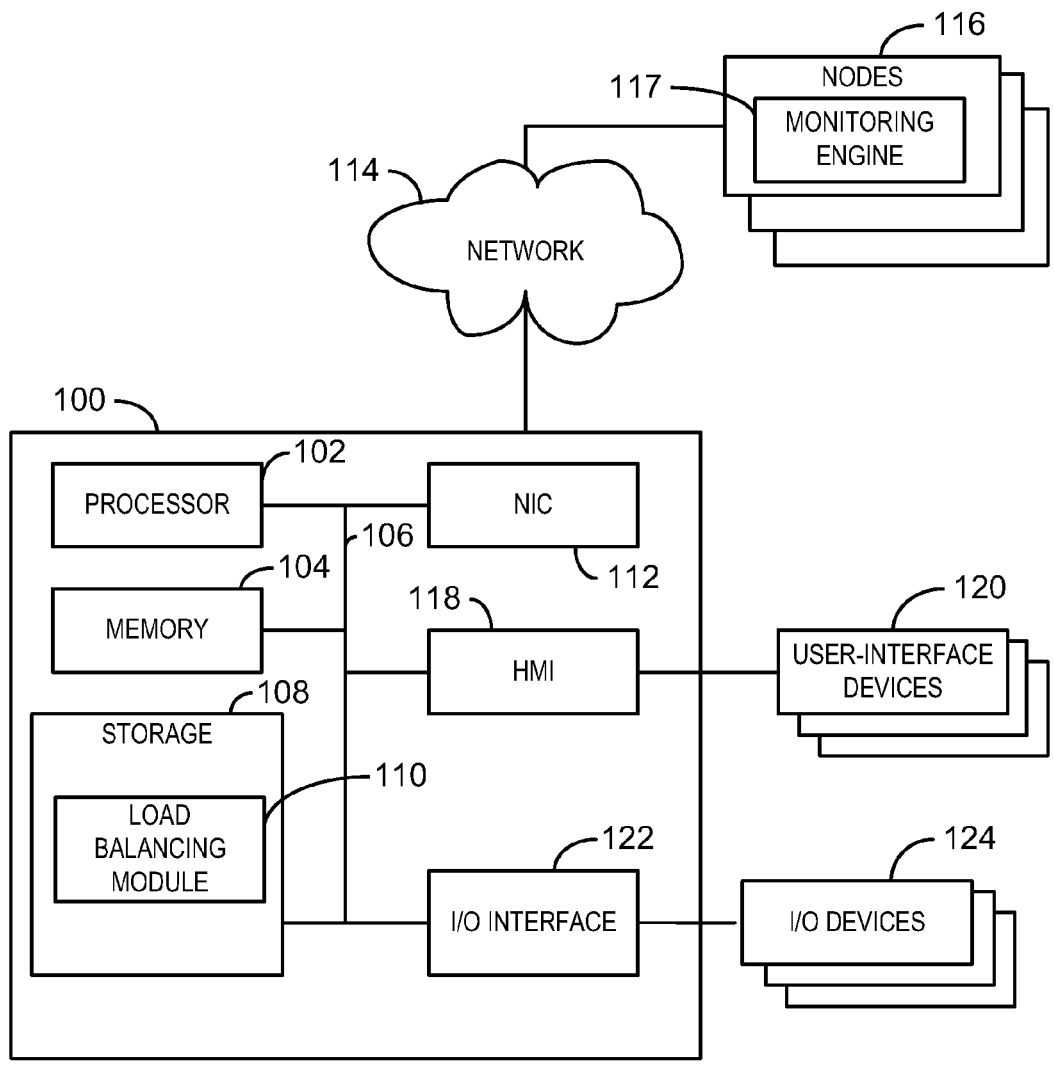
FIG. 1 is a computing system that may be used for load balancing in cluster storage systems.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

FIG. 1 is a computing system 100 that may be used for load balancing in cluster storage systems. The computing system 100 may be included within a computing device, such as a desktop computer, a laptop computer, or a mobile device, among others. Moreover, the computing system 100 may implemented within a server, wherein the server may include a Web server or a cloud server, among others. The computing system 100 may include a processor 102 that is adapted to execute stored instructions, as well as a memory device 104 that stores instructions that are executable by the processor 102. The processor 102 may be a single core processor, a multi-core processor, a computing cluster, or any number of other configurations. The memory device 104 can include random access memory (RAM), read only memory (ROM), flash memory, or any other suitable memory systems. The stored instructions executed by the processor 102 may implement a method for load balancing in cluster storage systems by moving specific data objects from a source node to any number of target nodes. The processor 102 may be connected through a bus 106 to one or more input and output devices.

The computing system 100 may include a storage device 108 adapted to store a load balancing module 110. In various embodiments, the load balancing module 110 can interact or coordinate with other modules hosted on the storage device 108 or control system components within the computing system 100. Further, in various embodiments, the computing system 100 may be a distributed system, and the load balancing module 110 may be a distributed program.

The storage device 108 may include a hard drive, an optical drive, a thumbdrive, an array of drives, or any combinations thereof. A network interface controller (NIC) 112 may be included to connect the computing system 100 through the bus 106 to a network 114. Through the network 114, the computing system 100 may be communicably coupled to multiple nodes 116. In various embodiments, the nodes 116 may be storage nodes, such as commodity personal computers (PCs), or servers. Moreover, the nodes 116 may be used to provide read or write access to data. In addition, the nodes 116 may also be interconnected to each other through the network 114. In some embodiments, the computing system 100 may be connected to tens of thousands of the nodes 116 organized in a spanning tree topology, wherein the spanning tree topology is a network design that includes redundant links between the nodes 116 to provide automatic backup paths if an active link between the nodes 116 fails. In some embodiments, a monitoring engine 117 may be running on the nodes 116 and may provide load usage and other metrics to the load balancing module 110.

In some embodiments, a human-machine interface (HMI) 118 may connect the computing system 100 to any number of user-interface devices 120, such as a touchscreen, a speaker, or a pointing device, among others. The computing system 100 may also be linked through the bus 106 to an I/O interface 122 adapted to connect the computing system 100 to any number of I/O devices 124. The I/O devices 124 may include, for example, a display device, an external hard drive, a Universal Serial Bus (USB) device, or a printer, among others. Moreover, the computing system 100 may not include all of the components disclosed herein in every case, and any number of additional components may be included within the computing system 100.

Figure 2:
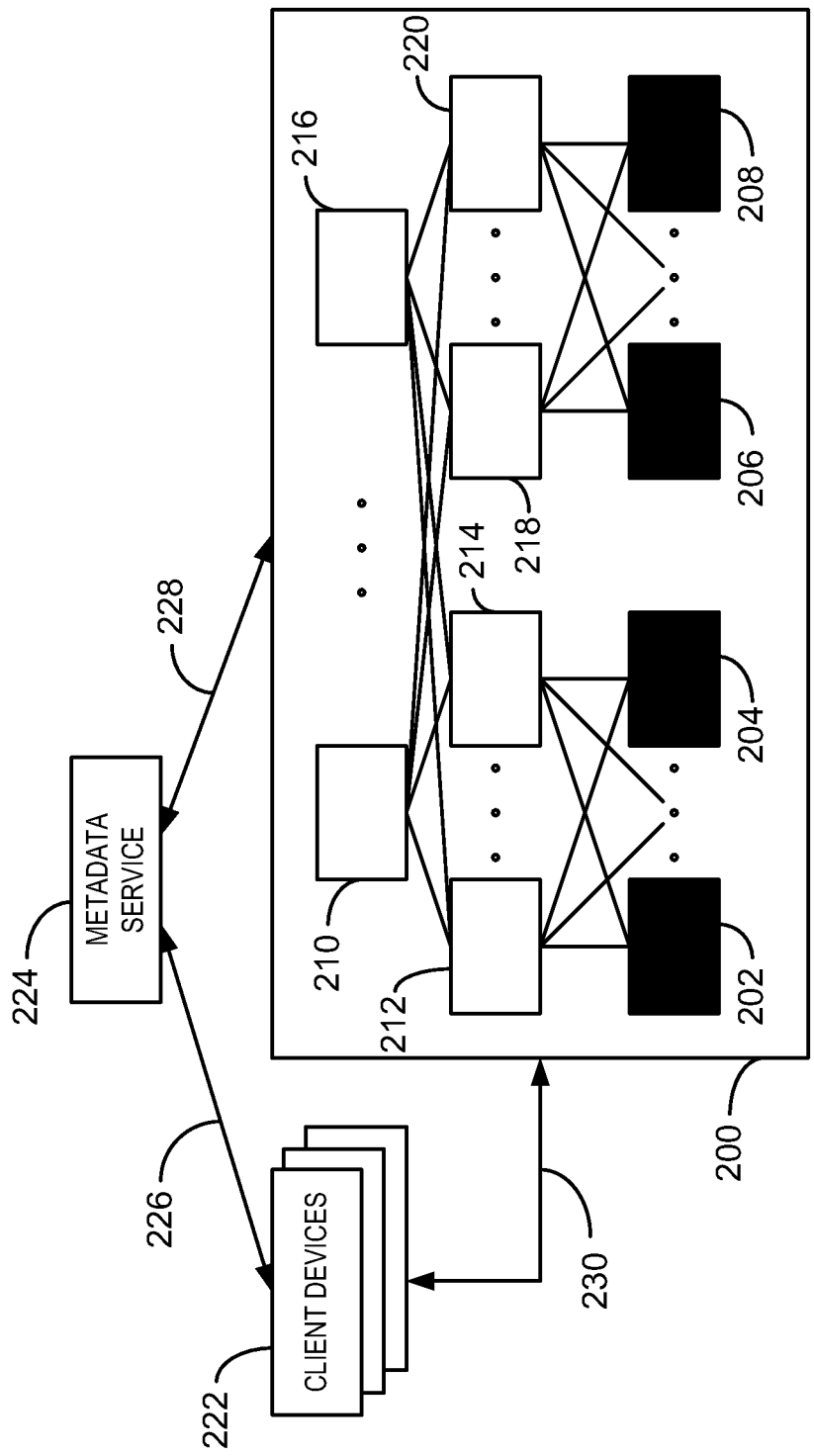
FIG. 2 is an embodiment of a cluster storage system for which load balancing may be performed in order to achieve high scalability and reduce reconfiguration costs.

FIG. 2 is an embodiment of a cluster storage system 200 for which load balancing may be performed in order to achieve high scalability and reduce reconfiguration costs. In various embodiments, the cluster storage system 200 may be a replicated, cluster-based, data object storage system including any number of nodes, such as nodes 202, 204, 206, and 208. The nodes 202, 204, 206, and 208 may be storage nodes, such as commodity PCs, or servers. Moreover, the cluster storage system 200 may include tens of thousands of the nodes 202, 204, 206, and 208 interconnected in a data center network, wherein the data center network may be organized in a spanning tree topology, as discussed with respect to FIG. 1. In various embodiments, the network connection between the nodes 202, 204, 206, and 208 within the cluster storage system 200 may be implemented using any number of network switches or routers 210, 212, 214, 216, 218, and 220. Furthermore, the connection between the nodes 202, 204, 206, and 208 may be a wireless or a wired connection, depending on the specific application.

Because the nodes 202, 204, 206, and 208 may be organized in a spanning tree topology, the network distance between multiple nodes may vary. This may result in differences in bandwidth connectivity between different nodes. For example, two nodes in the same rack or cluster may have higher bandwidth connectivity than two nodes in different racks or clusters. Thus, the proximity of one node to another node affects the data migration costs of moving data objects between the two nodes.

Data may be stored within each of the nodes 202, 204, 206, and 208 in units or partitions, or chunks. A partition may be a unit of data of some fixed size with a certain number of replicas, wherein the replicas may be identical copies of the partition. Moreover, for each partition, there may be a primary replica and any number of secondary replicas. In various embodiments, the replicas may enable fault tolerance by ensuring that the failure of one replica of a partition will not result in the loss of data, since the data also exists in all the other replicas of the partition. Furthermore, each replica of a particular partition may be placed in a separate fault domain, e.g., a separate node or rack, in order to increase the fault tolerance of the partition.

In various embodiments, the cluster storage system 200 may be communicably coupled to any number of client devices 222, wherein the client devices 222 may include mobile phones, tablets, desktop computers, laptop computers, electronic readers, televisions, or media players, among others. The client devices 222 may be used to initiate I/O requests, wherein the I/O requests may include requests to perform read or write operations, or transactions, within the cluster storage system 200. Therefore, in general, the client devices 222 may include any type of computing device which is capable of initiating such I/O requests.

Furthermore, the I/O requests from the client devices 222 may initially be sent to a metadata service 224, as indicated by the arrow 226. The metadata service 224 may determine which data objects are affected by a particular I/O request received from a client device 222. In addition, the metadata service 224 may map each data object to its constituent partition within the cluster storage system 200 and each partition to its current primary replica, as indicated by the arrow 228. Moreover, in some embodiments, the metadata service may periodically poll each node 202, 204, 206, and 208 within the cluster storage system 200 in order to track each node's availability, as indicated by the arrow 228. The metadata service may also use leases to maintain read and write consistency between the replicas of each partition within the nodes 202, 204, 206, and 208.

After the metadata service 224 has mapped each data object to its constituent partition and corresponding primary replica within the cluster storage system 200, the metadata service 224 may return the mapping information pertaining to the relevant data objects to the client device 222 which initiated the particular I/O request, as indicated by the arrow 228. The client device 222 may then execute the read and write operations specified by the particular I/O request by accessing the appropriate nodes 202, 204, 206, or 208 within the cluster storage system 200, as indicated by the arrow 230.

According to some embodiments, for a write request, the client device 222 may send a message to the cluster storage system 200 specifying a particular partition identification (ID) relating to the desired partition to which data is to be written, as well as the size of the data. The client device 222 may then send the actual data for the write request to the desired partition within the cluster storage system 200. Within the desired partition, the primary replica may determine the appropriate ordering of the write request and send the write request to the secondary replicas. If the write request is valid, the primary replica may send an "accept" message back to the client device 222 in order to confirm the execution of the write request.

Figure 3:
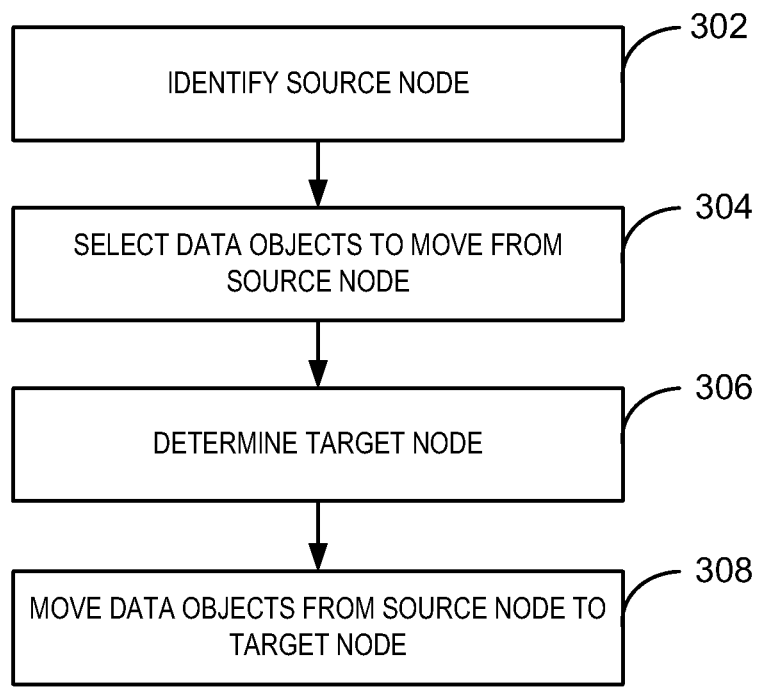
FIG. 3 is a block diagram of a method for load balancing in cluster storage systems.

FIG. 3 is a block diagram of a method 300 for load balancing in cluster storage systems. According to the method 300, load balancing may be accomplished through the migration of data objects between two nodes. Moreover, the data migration may be accomplished by move operations, which result in the migration of data objects between multiple nodes. Furthermore, it may be assumed that appropriate swap operations have already been performed prior to the beginning of the method 300. In some embodiments, the swap operations may be used to balance the load within a cluster storage system by switching a role of a primary replica and a secondary replica of a partition, wherein the primary replica and the secondary replica may be located on two separate nodes within the cluster storage system.

The method 300 may be used to minimize a total load of a hot spot, or source node, in a cluster storage system by migrating a certain number of data objects away from the hot spot. The goal of the method 300 may be to minimize the bandwidth cost, or data migration cost, of moving a particular data object from one node to another node. In some embodiments, this goal may be expressed as follows:

$$\text{minimize } \Sigma_i \Sigma_j X_{ij} B_{ij},  \quad \text{Eqn. 1}$$

wherein $X_{ij}$ is equal to 1 if the i-th object moves to the j-th node or 0 otherwise, and $B_{ij}$ is the bandwidth cost of moving the i-th object to the j-th node. Moreover, the method 300 may attempt to balance the load on the hot spot in the cluster storage system according to several constraints, or conditions. Such a balancing procedure may be used to alleviate the overload on the hot spot. In various embodiments, the conditions may be expressed as follows:

$$\forall j: \Sigma_i X_{ij} L_i - \Sigma_{i' \in S_j} \Sigma_{j'} X_{i'j'} L_i + L^*_j \leq C_j, \quad \text{Eqn. 2}$$

$$\forall i: \Sigma_{j \in R(i,r)} X_{ij} = 1, \quad \text{Eqn. 3}$$

$$\forall i, \forall j \notin R(i,r): X_{ij} \leq 0, \quad \text{Eqn. 4}$$

$$\forall p, \forall q: \Sigma_{i \in G_p} \Sigma_{j \in F_q} X_{ij} \leq 1, \text{and} \quad \text{Eqn. 5}$$

$$\forall i, \forall q: \Sigma_{j \in F_q} X_{ij} \leq I_{iq}, \quad \text{Eqn. 6}$$

wherein $C_j$ is the load capacity of the j-th node, $S_j$ is the set of data objects selected to be moved from the j-th node, $L_i$ is the load of the i-th object, $L^*_j$ is the total load of the j-th object, R(i,r) is the number of nodes within a radius r from the node to which the i-th object belongs, $G_p$ is the set of selected data with partition index p to move from the overloaded source node, $F_q$ is the set of nodes with the same fault domain index q, and $I_{iq}$ is equal to 0 if the q-th domain contains the same partition as the i-th object or 1 otherwise. As expressed by Eqn. 2, the first constraint is that, for each j-th node in the cluster storage system, the total load is to remain below a predetermined threshold value, i.e., the load capacity $C_j$. As expressed by Eqns. 3 and 4, the second constraint is that the target node is to be at least within a certain distance, or radius r, from the source node. It can be understood that, as used herein, the radius r may be considered a proxy for the number of routers, switches, and the like, that the data objects must pass through to reach a target node. This may often be reflected in physical proximity of two nodes, but such physical proximity is not required.

Furthermore, as expressed by Eqns. 5 and 6, the third constraint ensures fault tolerance by preventing data objects with the same partition from being placed on the same fault domain, e.g., in the same node or rack. In particular, $G_p$ denotes the group of all replicas belonging to partition index p in the set of selected data objects. Thus, Eqn. 5 imposes a constraint such that candidate data objects having the same partition index cannot be placed on the same fault domain, while Eqn. 6 imposes a constraint such that a candidate data object cannot be placed on a fault domain which already has a replica from the same partition. The fault tolerance constraints imposed by Eqns. 5 and 6 may be particularly useful when a set of candidate data objects is merged from nodes with overlapping search regions. For a single node, however, these constraints hold trivially, since at most one copy of a replica partition can be hosted on the node. Moreover, the constraints imposed by Eqns. 2-6 may be used for the development and implementation of the steps of the method 300, which are discussed in detail below.

The method 300 begins to block 302 with the identification of a source node within a cluster storage system from which to move a number of data objects. The method 300 may be executed according to an instance of a load balancing system, wherein the load balancing system is configured to balance the I/O request load on nodes within a particular cluster storage system. Moreover, the load balancing system may be a data management middleware system in a cloud computing platform that allows for the interaction between multiple nodes, or servers, contained within a particular cluster storage system.

In various embodiments, the source node may be a hot spot, i.e., a node with an aggregate, or total, load exceeding a predetermined threshold value. The total load for a particular node may be the total number of I/O operations per second or the total number of bytes transferred per second for read and write operations for the node. Moreover, the threshold value for determining whether a node is a hot spot may be determined such that a response time of the node may not increase above a specific value or throughput rate measured in terms of whether the number of transactions processed in a given time window exceeds a specific value.

Furthermore, in some embodiments, a metadata service may be used to identify the source node from which to move the data objects. The metadata service may identify the source node in response to an influx of a predetermined number of I/O requests for the particular source node from any of a number of client devices. The predetermined number of I/O requests may be chosen such that, if the predetermined number of I/O requests is received for a particular node, the node may be considered a hot spot. Additionally, in various embodiments, the metadata service may help to execute the method 300 by mapping incoming I/O requests from a client device to specific data objects within any of the nodes within the cluster storage system, including a source node or a target node, or both.

At block 304, the data objects to be moved from the source node may be selected. In various embodiments, the data objects may be selected such that, once the data objects have been moved away from the source node, the total load of the source node will no longer exceed a threshold value. Thus, it may be desirable to select data objects based on a load value of each individual data object. The load value may be equal to the number of I/O requests for a particular data object within the source node. In some embodiments, an integer decision variable may be assigned to each data object within the source node. If the integer decision variable is equal to 1, indicating that the particular data object has a high load value, the data object may be moved away from the source node. If the integer decision variable is equal to 0, indicating that the particular data object has a low load value, the data object may remain within the source node. Furthermore, in a various embodiments, a real decision variable may be assigned to each data object within the source node. The real decision variable may be equal to any real number between 0 and 1, inclusive, wherein 0 indicates that the data object has a load value of 0. Moreover, the data objects may be arranged in descending order according to their real decision variable, and the data objects with the highest real decision variables, indicating that they have the highest number of I/O requests, may be selected to be moved first. Furthermore, in some embodiments, the data objects to be moved from the source node may be randomly selected. At block 306, a target node within the cluster storage system may be determined based on the total load of the target node and the proximity of the target node to the source node. For example, the target node may be any node within the cluster storage system that has a total load not exceeding a predetermined threshold value, i.e., that is not a hot spot, and that is within a certain predetermined distance, or radius, from the source node. In some cases, multiple target nodes may be determined for a particular instance of the method 300, and the data objects may be selectively moved to any of the target nodes. Target nodes which are closest to the source node may be preferred, since data migration costs increase as the distance between the target node and the source node increases. Thus, an initial radius from the source node may be specified for the area in which to identify an appropriate target node. Then, if an appropriate target node cannot be found within the initial radius, the radius may be incrementally increased until an appropriate target node is found. Furthermore, as discussed above, the radius, or radial distance, may be considered a proxy for the number of routers, switches, and the like, that the data objects must pass through to reach the target node. This may often be reflected in physical proximity of two nodes, but such physical proximity is not required.

At block 308, the data objects may be moved from the source node to the target node. In some embodiments, the efficiency of the method 300 may be increased by selectively moving specific data objects to any of a number of target nodes. Moreover, the data objects may be moved, or migrated, according to the shortest possible route from the source node to the appropriate target node, since data migration costs increase as the distance of travel of a data object increases.

Moreover, the method 300 is not intended to indicate that the steps of the method 300 are to be executed in any particular order or that all of the steps are to be present in every case. Furthermore, steps may be added to the method 300 according to the specific application. For example, the method 300 may be used to identify in parallel a number of sets of non-overlapping source nodes with total loads exceeding the threshold value. The source nodes within a particular set of sources nodes may be within a specific radial distance from each other, i.e., they may have overlapping search radii. A number of data objects may be selected to be moved from each of the sets of source nodes, any number of appropriate target nodes within a specific search radius from each of the sets of source nodes may be determined, and the data objects may be concurrently moved from each of the sets of source nodes to the target nodes. Multiple instances of the load balancing system may be executed in parallel in order to concurrently move the data objects from each of the sets of source nodes to the chosen target nodes. In various embodiments, such a method of performing data migration concurrently for a number of disjoint, or non-overlapping, sets of source nodes may be referred to as a "divide-and-conquer" load balancing approach.

Further, in various embodiments, the moving of the data objects may result in interference with foreground running applications in the network during the reconfiguration of the data objects and/or within the corresponding source and target nodes. This may be alleviated by specifying a resource bandwidth budget, or by separating foreground traffic and background traffic via the use of transport protocols.

Figure 4:
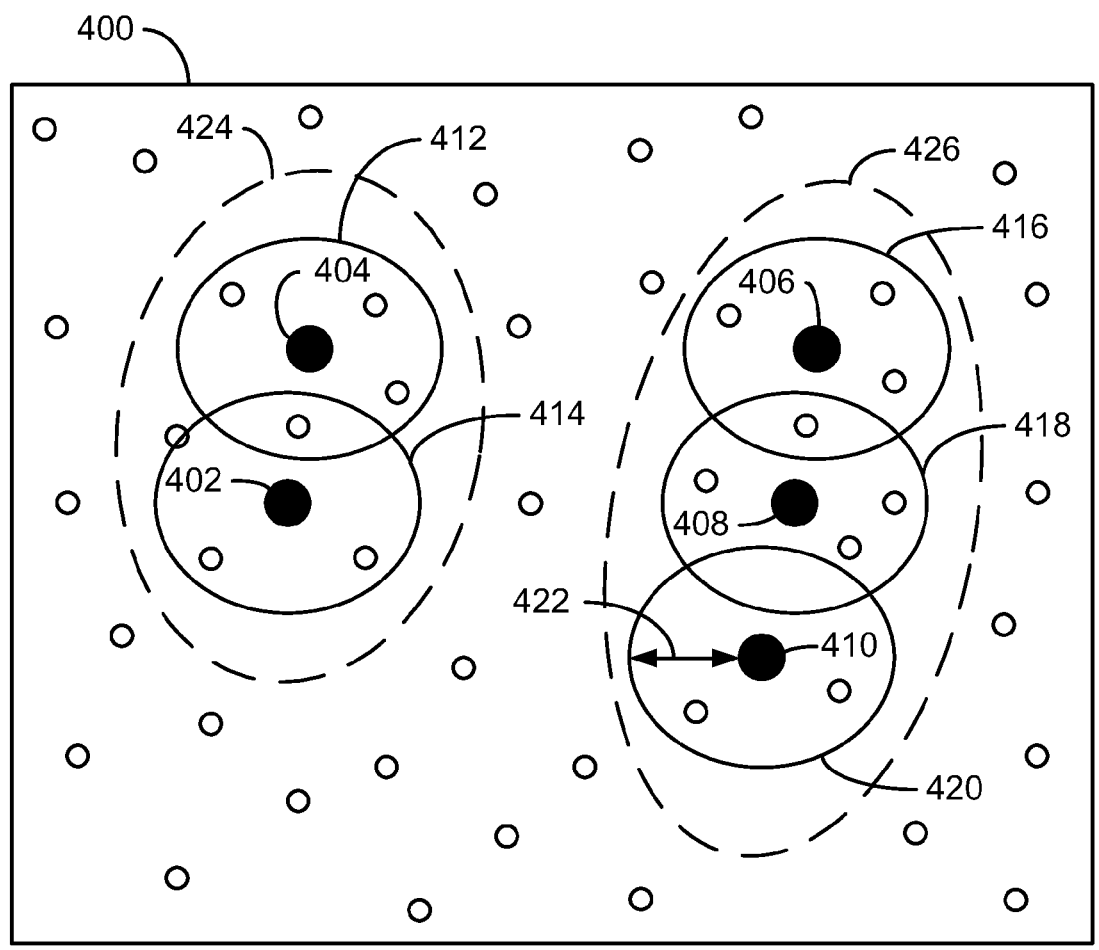
FIG. 4 is an illustration of a divide-and-conquer load balancing approach for disjoint groups of overlapping hot spots.

FIG. 4 is an illustration 400 of a divide-and-conquer load balancing approach for disjoint groups of overlapping hot spots. The illustration 400 may represent a number of source nodes within a cluster storage system. The cluster storage system may include a first hot spot 402, a second hot spot 404, a third hot spot 406, a fourth hot spot 408, and a fifth hot spot 410. Moreover, the hot spots 402, 404, 406, 408, and 410 may each be included within a "neighborhood" 412, 414, 416, 418, and 420, respectively, of a predetermined radius, such as the radius 422. The predetermined radius may be a standard radius used for all of the hot spots 402, 404, 406, 408, and 410, or may be a specific, unique radius for each individual hot spot 402, 404, 406, 408, or 410.

Hot spots with overlapping neighborhoods may be merged into groups 424 and 426. In various embodiments, the neighborhoods 412 and 414 for the first hot spot 402 and the second hot spot 404, respectively, may be merged into the group 424. In addition, the neighborhoods 416, 418, and 420 for the third hot spot 406, the fourth hot spot 408, and the fifth hot spot 410 may be merged into the group 426. Then, the load balancing system may execute the method 300 for the groups 424 and 426 in parallel. Moreover, load balancing for the hot spots within each group 424 or 426 may be executed concurrently according to the method 300. In various embodiments, this divide-and-conquer load balancing approach may result in a decrease in computation costs for the method 300 without a loss in accuracy.

Figure 5:
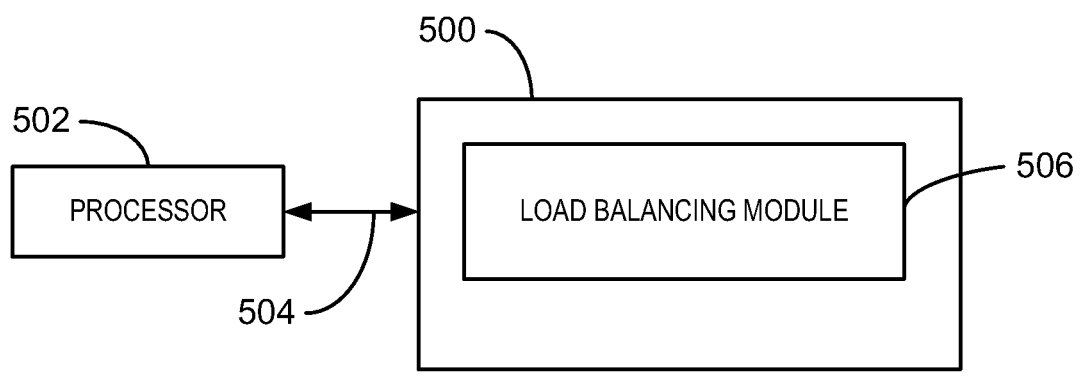
FIG. 5 is a block diagram showing a tangible, non-transitory, computer-readable medium that stores code adapted to perform load balancing in cluster storage systems.

FIG. 5 is a block diagram showing a tangible, non-transitory, computer-readable medium 500 that stores code adapted to perform load balancing in cluster storage systems. The tangible, non-transitory, computer-readable medium 500 may be accessed by a processor 502 over a computer bus 504. Furthermore, the tangible, non-transitory, computer-readable medium 500 may include code configured to direct the processor 502 to perform the steps of the current method. The various software components discussed herein may be stored on the tangible, non-transitory, computer-readable medium 500, as indicated in FIG. 5. For example, a load balancing module 506 may be used to balance the load on specific nodes within a cluster storage system by migrating data objects between nodes. Moreover, the tangible, non-transitory, computer-readable medium 500 may include additional software components not shown in FIG. 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for load balancing in a cluster storage system, comprising:
    identifying a plurality of source nodes as hot spots within the cluster storage system from which to move a plurality of data objects, wherein a hot spot comprises a node with a total load exceeding a threshold value;
    dividing the plurality of source nodes into a plurality of sets of source nodes, wherein each of the plurality of sets of source nodes comprises one source node or a small subset of source nodes with overlapping search radii;
    selecting the plurality of data objects to move from each of the plurality of sets of source nodes, wherein the plurality of data objects are chosen in each node such that the total load of each source node no longer exceeds the threshold value;
    determining a plurality of target nodes within a specific search radius from each of the plurality of sets of source nodes;
    concurrently moving the plurality of data objects from each of the plurality of sets of source nodes to the plurality of target nodes.

2. The method of claim 1, comprising moving any of the plurality of data objects from the source node to any of a plurality of target nodes based on the total load on each of the plurality of target nodes and the proximity of each of the plurality of target nodes to the source node.

3. The method of claim 1, comprising:
identifying a plurality of source nodes with total loads exceeding the threshold value, wherein the plurality of source nodes are within a specific radial distance from one another;
selecting a plurality of data objects to move from each of the plurality of source nodes;
determining a plurality of target nodes within a specific search radius from the plurality of source nodes; and
concurrently moving the plurality of data objects from the plurality of source nodes to the plurality of target nodes.

4. The method of claim 1, comprising randomly selecting the plurality of data objects to move from the source node.

5. The method of claim 1, comprising selecting the plurality of data objects to move from the source node based on a load value, wherein the plurality of data objects are selected starting with a data object with a highest load value and continuing in a descending order.

6. The method of claim 5, wherein the load value comprises a number of input/output requests for a particular data object within the source node.

7. The method of claim 1, wherein moving the plurality of data objects from the source node to the target node comprises minimizing interference during reconfiguration by specifying a resource bandwidth budget or separating foreground traffic and background traffic via the use of transport protocols.

8. The method of claim 1, comprising selecting the plurality of data objects to move from the source node based on a real decision variable assigned to each data object within the source node, wherein the real decision variable comprises a real number between zero and one, or equal to zero or one, and wherein the plurality of data objects are selected to be moved starting with a data object with a highest real decision variable and continuing in a descending order.

9. The method of claim 1, comprising identifying the source node within the cluster storage system from which to move the plurality of data objects using a metadata service in response to an influx of a predetermined number of input/output requests for the source node from any of a plurality of client devices.

10. The method of claim 1, wherein the threshold value is a predetermined threshold value indicating load capacity of the source node comprising determining the threshold value such that a response time of the node may not increase above a specific value or throughput rate measured in terms of whether the number of transactions processed in a given time window exceeds a specific value.

11. A system for load balancing in a cluster storage system, comprising:
a plurality of source nodes, wherein each source node comprises a hot spot node within the cluster storage system with a first total load exceeding a threshold value, wherein the plurality of source nodes are divided into a plurality of sets of source nodes, wherein each of the plurality of sets of source nodes comprises one source node or a small subset of source nodes with overlapping search radii;
a plurality of target nodes, wherein each of the plurality of target nodes comprises a node within the cluster storage system with a second total load not exceeding the threshold value, and wherein each of the plurality the target nodes is within a specific search radius from each of the plurality of sets of source nodes;
a load balancing system configured to:
identify each of the plurality of target nodes by incrementally increasing the specific radius until the target node is identified;
select a plurality of data objects to move from each of the plurality of sets of source nodes to an associated target node, wherein the plurality of data objects are chosen such that the first total load of the source node no longer exceeds the threshold value; and
concurrently move the plurality of data objects from each of the plurality of sets of source nodes to the plurality of target nodes.

12. The system of claim 11, wherein the first total load and the second total load comprise a total number of input/output operations per second or a total number of bytes transferred per second for read and write operations.

13. The system of claim 11, comprising executing multiple instances of the load balancing system in parallel in order to concurrently move a plurality of data objects from each of a plurality of source nodes, wherein the plurality of source nodes comprise non-overlapping nodes that are at least a predetermined distance from one another.

14. The system of claim 11, wherein the target node and the source node comprise servers interconnected through a network, and wherein swap operations comprising swapping the role of a primary replica corresponding to the partition of the data object to be moved are performed prior to moving the data object.

15. The system of claim 11, wherein the system comprises a metadata service configured to map an incoming input/output request from a client device to specific data objects within the source node or the target node, or any combinations thereof.

16. One or more non-transitory, computer-readable storage media for storing computer-readable instructions, the computer-readable instructions providing a load balancing system when executed by one or more processing devices, the computer-readable instructions comprising code configured to:
identify a plurality of source nodes from which to move a plurality of data objects, wherein the plurality of source nodes each comprise a hot spot;
divide the plurality of source nodes into a plurality of sets of source nodes, wherein each of the plurality of sets of source nodes comprises one source node or a small subset of source nodes with overlapping search radii;
select the plurality of data objects to move from each of the plurality of sets of source nodes, wherein the plurality of data objects are chosen such that the source node is no longer the hot spot;
determine a plurality of target nodes within a specific search radius from each of the plurality of sets of source nodes, wherein the target node does not comprise a hot spot;
concurrently move the plurality of data objects from each of the plurality of sets of source nodes to the plurality of target nodes.

17. The one or more non-transitory, computer-readable storage media of claim 16, wherein the hot spot comprises a node with a total number of input/output operations per second or a total number of bytes transferred per second exceeding a threshold value.

* * * * *